(12) United States Patent
Amaya-Benitez et al.

(10) Patent No.: US 12,222,455 B2
(45) Date of Patent: Feb. 11, 2025

(54) TIME OF FLIGHT APPARATUS AND METHOD

(71) Applicant: Sony Semiconductor Solutions Corporation, Kanagawa (JP)

(72) Inventors: Manuel Amaya-Benitez, Stuttgart (DE); Ward Van Der Tempel, Muizen (BE); Kaji Nobuaki, Kanagawa (JP); Hiroaki Nishimori, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 1000 days.

(21) Appl. No.: 17/276,114

(22) PCT Filed: Sep. 17, 2019

(86) PCT No.: PCT/EP2019/074858
§ 371 (c)(1),
(2) Date: Mar. 12, 2021

(87) PCT Pub. No.: WO2020/058264
PCT Pub. Date: Mar. 26, 2020

(65) Prior Publication Data
US 2022/0050185 A1    Feb. 17, 2022

(30) Foreign Application Priority Data
Sep. 19, 2018   (EP) .................................... 18195353

(51) Int. Cl.
*G01C 3/08*    (2006.01)
*G01S 7/484*    (2006.01)
(Continued)

(52) U.S. Cl.
CPC ............ *G01S 7/4865* (2013.01); *G01S 7/484* (2013.01); *G01S 17/89* (2013.01)

(58) Field of Classification Search
CPC ......... G01S 7/4865; G01S 7/484; G01S 17/89
See application file for complete search history.

(56) References Cited

U.S. PATENT DOCUMENTS 9,294,754 B2    3/2016    Billerbeck et al.
9,723,233 B2    8/2017    Grauer et al.
(Continued)

FOREIGN PATENT DOCUMENTS

CN    107209254 A    9/2017

OTHER PUBLICATIONS

PCT/EP2019/074858, Nov. 28, 2019, International Search Report and Written Opinion.
(Continued)

*Primary Examiner* — Mark Hellner
(74) *Attorney, Agent, or Firm* — Wolf, Greenfield & Sacks, P.C.

(57) ABSTRACT

A time-of-flight apparatus has: a light source for emitting light to a scene; a light detector for detecting light from the scene; and a control, the control being configured to: acquire a frame of detected light from the light detector, wherein the frame corresponds to a predetermined time interval, and drive the light source for emitting light during the acquisition of the frame, wherein the light energy accumulated within the frame has a predetermined value, and wherein the frame is divided into active light time intervals during which light is emitted to the scene.

20 Claims, 11 Drawing Sheets

(51) Int. Cl.
G01S 7/4865 (2020.01)
G01S 17/89 (2020.01)

(56) References Cited

U.S. PATENT DOCUMENTS

| | | |
|---|---|---|
| 2010/0202667 A1 | 8/2010 | Ren et al. |
| 2013/0201288 A1* | 8/2013 | Billerbeck ............ H04N 13/204 |
| | | 348/46 |
| 2017/0242107 A1* | 8/2017 | Dussan ................. G01S 7/4816 |
| 2017/0322310 A1* | 11/2017 | Godbaz ................... G01S 17/50 |
| 2018/0100928 A1 | 4/2018 | Keilaf et al. |
| 2018/0124372 A1 | 5/2018 | Yang et al. |
| 2019/0197712 A1* | 6/2019 | Talbert ................... H04N 23/13 |

OTHER PUBLICATIONS

International Search Report and Written Opinion mailed Nov. 28, 2019 in connection with International Application No. PCT/EP2019/074858.

[No Author Listed], International Standard IEC 60825-1. Edition 3.0. May 2014. 242 pages.

Keller et al., Novel illumination strategy for lidar enabled by update in the laser product standards. Journal of Laser Applications. Feb. 9, 2018;30(1):012011. 7 pages.

Lum et al., Frequency-modulated continuous-wave LiDAR compressive depth-mapping. arXiv:1803.01729v2. May 16, 2018. 16 pages.

* cited by examiner

TIME OF FLIGHT APPARATUS AND METHOD

CROSS-REFERENCE TO RELATED APPLICATIONS

This application claims the benefit under 35 U.S.C. § 371 as a U.S. National Stage Entry of International Application No. PCT/EP2019/074858, filed in the European Patent Office as a Receiving Office on Sep. 17, 2019, which claims priority to European Patent Application Number 18195353.0, filed in the European Patent Office on Sep. 19, 2018, each of which is hereby incorporated by reference in its entirety.

TECHNICAL FIELD

The present disclosure generally pertains to a time-of-flight apparatus and a method for controlling such a time-of-flight apparatus.

TECHNICAL BACKGROUND

Generally, time-of-flight (ToF) systems are known, which are used for determining a distance to or depth map of a region of interest (scene).

Typically, when a ToF (Time-of-Flight) camera is used, a minimum SNR (signal to noise ratio) is needed, in order to obtain depth-maps. The SNR value may be too small when the active illumination of the scene is weak, which may be the case, for example, at long distances or when the ambient light is strong, e.g., due to sun light.

Generally, it is known that the active illumination reflected in a scene is inversely proportional to the square of the distance from the light source. The ambient light is affecting the depth measurements as shot noise. In both cases, a more intense active illuminator or light source assists in improving the SNR, but eye safety regulations (e.g. IEC 60825-1 ed. 3, 2014) limit the total amount of illumination that a light source can emit.

Hence, there is generally a need for providing a time-of-flight apparatus and a method for controlling such a time-of-flight apparatus.

SUMMARY

According to a first aspect, the disclosure provides a time-of-flight apparatus, comprising a light source for emitting light to a scene; a light detector for detecting light from the scene; and a control, the control being configured to acquire a frame of detected light from the light detector, wherein the frame corresponds to a predetermined time interval, and drive the light source for emitting light during the acquisition of the frame, wherein the light energy accumulated within the frame has a predetermined value, and wherein the frame is divided into active light time intervals during which light is emitted to the scene.

According to a second aspect, the disclosure provides a method for controlling a time-of-flight apparatus, including a light source for emitting light to a scene and a light detector for detecting light from the scene, the method comprising acquiring a frame of detected light from the light detector, wherein the frame corresponds to a predetermined time interval, and driving the light source for emitting light during the acquisition of the frame, wherein the light energy accumulated within the frame has a predetermined value, and wherein the frame is divided into active light time intervals during which light is emitted to the scene.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 6:
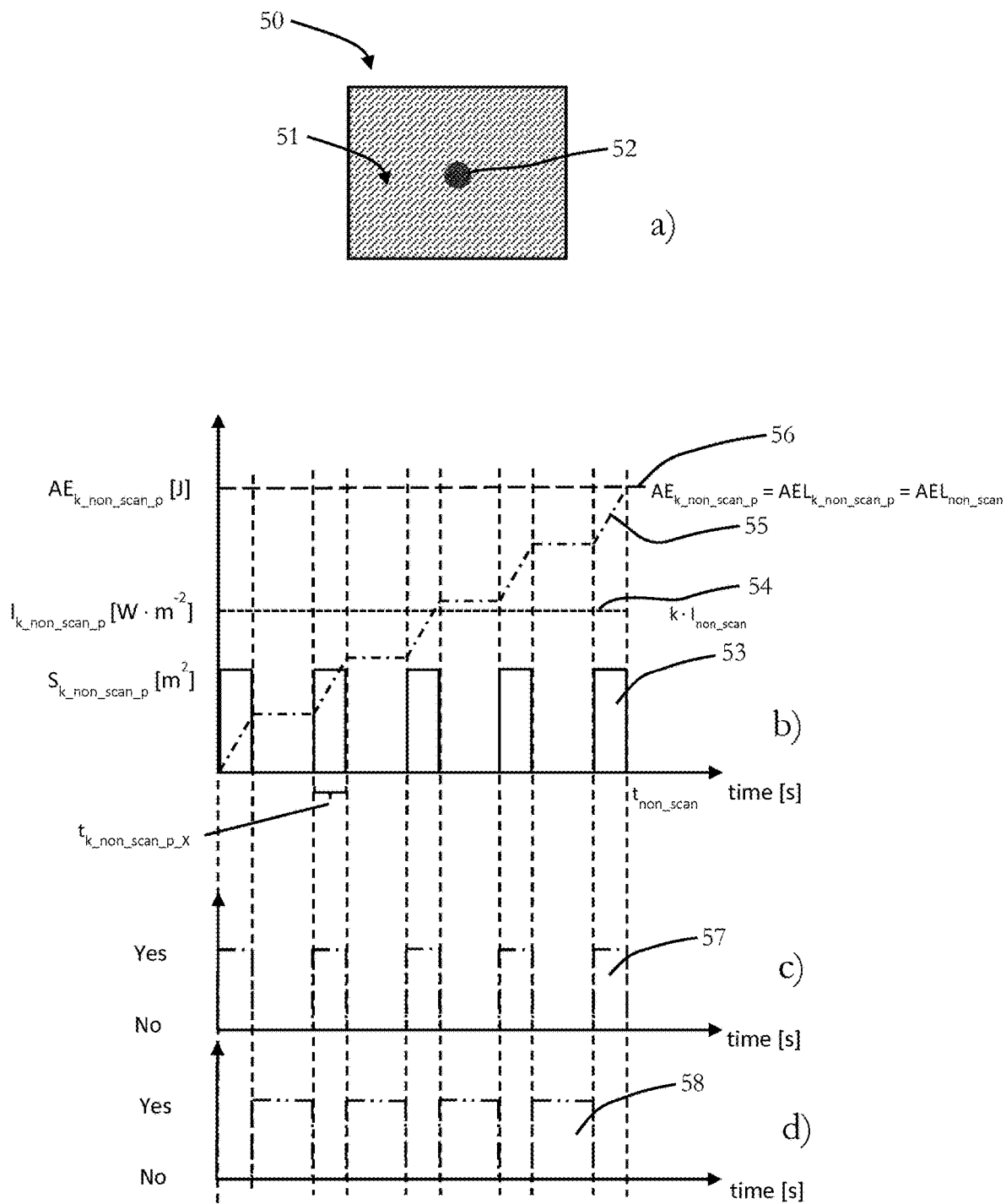
FIG. 6 illustrates an embodiment of illuminating a scene with several active light time intervals.

Before a detailed description of the embodiments under reference of FIG. 6 is given, general explanations are made.

As mentioned, in the outset, it is known for time-of-flight cameras or systems that the SNR (signal-to-noise ratio) may be too small under sun light conditions, long distances or the like and that increasing the intensity of the light source may improve the SNR.

Furthermore, in some embodiments, a simple illuminator for a ToF camera, such as a full field illuminator (FFI), emits modulated (pulsed) light continuously during a component-frame time acquisition. A depth-map frame is calculated based on several component-frames. However, it has been recognized that under the conditions defined by eye safety regulations, it may be the case that the highest light intensity that can be used with FFI is not enough to obtain high SNR values at long distances and/or under ambient light conditions.

Hence, some embodiments pertain to a time-of-flight apparatus, including a light source for emitting light to a scene; a light detector for detecting light from the scene; and a control, the control being configured to acquire a frame of detected light from the light detector, wherein the frame corresponds to a predetermined time interval, and drive the light source for emitting light during the acquisition of the frame, wherein the light energy accumulated within the frame has a predetermined value, and wherein the frame is divided into active light time intervals during which light is emitted to the scene.

Generally, the time-of-flight apparatus may be based on any of known ToF technologies, including direct ToF sensors, where the directly the roundtrip of photons is measured, which are emitted and scattered from a scene, or indirect ToF sensors, where a phase shift of light is measured, which is emitted and scattered from a scene scattered, for determining the distance, a depth map, or the like.

The light source may include LEDs (light emitting diodes) or it may be based on laser elements, such as VCSELs (vertical cavity surface emitting lasers) or the like. The light source may be configured as CW (continuous wave) light source (also referred to as illuminator) or PW (pulsed-wave) light source, including illuminations and illuminators as described in eye safety standards, such as e.g. IEC 60825-1 Ed2 2007, or IEC 60825-1 Ed3 2014.

The light detector may be based on any type of known sensing technology for time-of-flight systems and may be based on, for example, CMOS (complementary metal-oxide semiconductor), CCD (charge coupled device), SPAD (single photon avalanche diode), CAPD (current assisted photodiode) technology or the like.

Moreover, the light detector may include multiple pixels, which may be arranged in an array, as it is generally known in the art for light detectors in the field of time-of-flight.

The control may include one or more (micro)processors, field gate processors, memory, and other components which are typically implemented in an electronic control of a time-of-flight system/apparatus.

The control may be configured in hardware and/or in software.

Furthermore, some embodiments pertain to a method for controlling a time-of-flight apparatus, in particular as described herein, including a light source for emitting light to a scene and a light detector for detecting light from the scene, as discussed herein, wherein the method includes acquiring a frame of detected light from the light detector, wherein the frame corresponds to a predetermined time interval, and driving the light source for emitting light during the acquisition of the frame, wherein the light energy accumulated within the frame has a predetermined value, and wherein the frame is divided into active light time intervals during which light is emitted to the scene.

In the following, different embodiments are discussed which pertain to the time-of-flight apparatus and the configuration of the control, wherein each of the features which are discussed may also be part of embodiments of the method for controlling the time-of-flight apparatus.

The frame of detected light from the light detector may include data, which is representative of the light which has been detected by the light detector. The frame may have a certain and predefined length (in time), i.e. the predetermined time interval, and it (e.g. its length) may be predefined in advance or it may be calculated (dynamically) on the basis of other parameters, such as ambient light conditions, parameters describing the characteristic of the illumination of the scene or the like.

In some embodiments, the frame corresponds to the time, which is needed to acquire image data for the whole scene, such that one frame is based on at least one full or completed illumination of the scene, which, in turn is implemented by driving the light source (and other components which may be necessary) accordingly.

The predetermined value for the accumulate light energy within the frame may be predefined in advance or it may be (dynamically) calculated based on other parameters, e.g. based on how much light energy may be emitted to an area within a defined time period and/or within a predetermined distance to the time-of-flight apparatus (e.g. its light source). In particular, the predetermined value may be based on a currently known or on a further or future eye safety standard and it may represent a value, which is such chosen that an (e.g. human) eye is not hurt or burnt.

The frame is divided into active light time intervals during which light is emitted to the scene, whereby between two consecutive active light time intervals a period of time exists where no light is emitted to the scene. This period of time of non-emission of light to the scene may be the same between the active light time intervals or it may be different. Hence, the light is not continuously emitted to the scene through the whole frame, but the emitted light energy is distributed in time over the frame, namely over the active light time intervals. Moreover, as will also be discussed further below, areas of the scene and/or corresponding areas of the light detector may be illuminated in multiple passes (time slots corresponding to the active light time intervals), separated by a non-illumination period or time intervals.

The stop of emission of light or the non-emitting of light may be accomplished by different measures, as it is generally known, e.g. by deactivating the light source, activating a shutter or the like at or in front of the light source or other measures.

Thereby, the single exposure time of the light detector as well as of the scene may be reduced within a frame (compared to prior art ToF, since the active light time intervals are shorter than the whole frame), while the total light energy which is acquired by the light detector and which is emitted to scene is not reduced. Hence, the frame length may not be reduced which may be needed for illuminating the whole scene. The reduction in the exposure time may decrease the noise produced by the ambient light and/or it may improve the SNR, since the ratio between the emitted light energy and the ambient light energy becomes larger.

Figure 1:
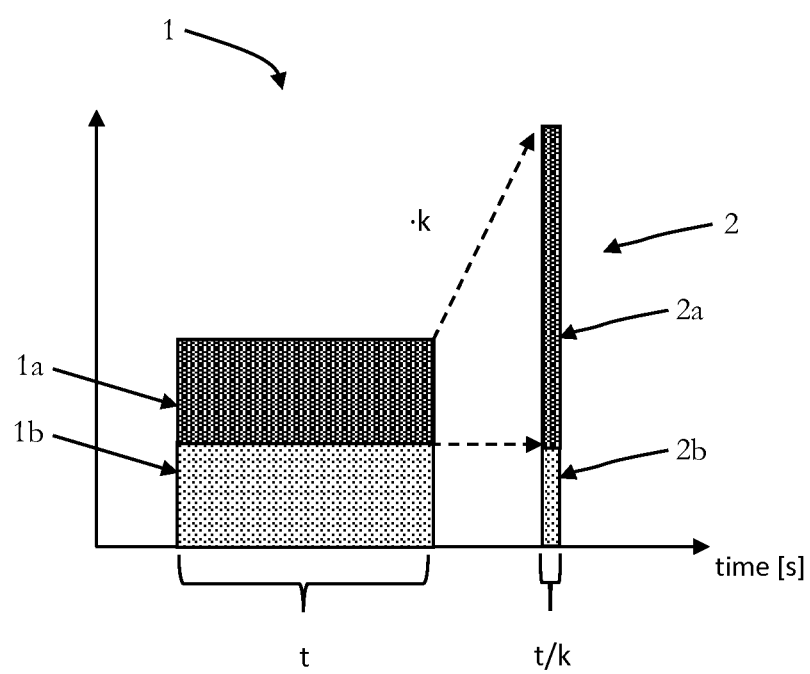
FIG. 1 illustrates reducing the illumination time of a light source.

This is also illustrated in FIG. 1, which shows the power intensity of light on the ordinate and the time on the abscissa.

In a first case under reference number 1, the amount of active light 1*a* is emitted for a time t and in this time an associated amount of ambient light 1*b* is detected at the light detector. In contrast to this, in a case 2, which is an embodiment of the present invention, the same amount of light 2*a* as the amount of light 1*a* is emitted, but in a time interval t/k which is much smaller (only a part k of time interval t) than the time interval t, such that the SNR improves for case 2, since the amount of emitted light increases compared to the amount of ambient light.

However, the pure implementation of case 2 of FIG. 1 may result in some embodiments into a violation of eye safety, which defines the limit of power intensity of light which may be received by a predefined pupil within a predefined time interval (for a predefined light source, e.g. class 1 laser or the like).

In some embodiments, eye safety standards, e.g. IEC 60825-1 Ed2 2007, or IEC 60825-1 Ed3 2014, define for Class 1 lasers, which may be used in a light source in some embodiments, the largest illumination energy (AEL, Accessible Energy Limit) that can be accepted by an eye using a reference pupil size during the typical ToF frame durations.

This AEL may decrease with the reduction of the light detector exposure time for a typical light burst duration and wavelength of the light source (e.g. lasers). Therefore, a straight use of the teaching of case 2 of FIG. 1, as discussed above, may turn out to involve a non-eye safe illumination, since the illumination energy may be larger than the limit AEL.

Furthermore, some embodiments pertain to 1D-scanning, wherein a one-dimensional scanning of the scene is performed (e.g. based on a laser beam or the like), while other embodiments pertain to 2D-scanning, wherein a two-dimensional scanning of the scene is performed (e.g. base on emitting a sheet of light or the like).

In some embodiments, the light source is adapted to emit light having a field of illumination, which is at least partially smaller than a predefined pupil diameter (e.g. the light source emits light rays, sheet of lights, light beams having a certain width/height, etc.).

Hence, the light source, which may be, for example, implemented as an active modulated laser illuminator emits light beams with a field of illumination (FOI) with at least one of the dimensions, vertical or/and horizontal, smaller than the pupil diameter stablished in the eye safety regulations (e.g. pupil diameter of 7 mm for IEC 60825-1 ed. 3, 2014), wherein a (given) distance to the pupil may be considered (e.g. distance from the illuminator to the pupil of 100 mm for IEC 60825-1 ed. 3, 2014).

In some embodiments, the light is emitted to adjacent areas of the scene. Hence, a scene may be (logically) divided into multiple adjacent areas, which may partially overlap or which may not overlap at all, such that the different areas are illuminated by the emitted light consecutively (wherein the light source is configured to illuminate the different areas of the scene).

In some embodiments, the active light time intervals are associated with the adjacent areas, such that between the illumination of each of the areas a time interval may exist in which no light is emitted to the corresponding areas (i.e. the areas are not illuminated).

In some embodiments, between two active light time intervals at least one non-active light time interval is provided, wherein the scene may not be illuminated during the non-active light time interval.

In some embodiments, the light detector detects light during the active light time intervals. For instance, the flow of electrons from photosensitive areas, such as photodiodes of each of ToF sensor pixel, to its storage nodes are synchronized with the light source (e.g. laser source illuminator). For example, when an area of the light detector should not receive light (which is emitted from the light source and scattered from the scene), the area of the light detector, e.g. the associated pixel(s) blocks the detection of light.

Depending on the technology used in some embodiments, the gated pixels or shuttered pixels are provided for blocking the detection of light, or mixing signals in a CAPD (current assisted photodiode) are controlled accordingly. Moreover, in some embodiments, a global control is provided or the control is configured accordingly such that all pixels of the light detector are controlled simultaneously, while in others, a line-based control may be provided where the pixels belonging to a row and/or column are controlled simultaneously, or an individual control per pixel may be provided.

In some embodiments, the light detector is reset outside the active light time intervals. For example, each pixel of the light detector has an overflow gate to flush those electrons generated by the ambient light during the periods the light source (e.g. laser illuminator) is off (i.e. outside the active light time intervals), i.e. when the active light source is not emitting light.

In some embodiments, as also mentioned above, the light detector includes multiple pixels and between different active light time intervals different pixels are active. For instance, when adjacent areas of the scene are illuminated associated pixels or pixel areas or pixel groups of the light detector may be active, such that only pixels detect light which are expected to detect light due to the illumination of the corresponding area of the scene.

In some embodiments, light is emitted at least twice to the same area of the scene, thereby the scene may be scanned multiple times such that light energy, which is emitted in total during one frame, is spread over scans of the scene.

Hence, the emitted light energy may be spread over time during one frame and/or spread over the scene during one frame.

In some embodiments, as also discussed above, the predetermined value for the accumulated light energy depends on at least one of time and light energy received by a predetermined pupil in the scene. The pupil may have a predefined diameter, as mentioned above, and may have a predetermined distance to the light source (or to the time-of-flight apparatus) and the predetermined value may be based on the light energy which is received by such a pupil, since on that basis it can be determined whether the emitted light energy complies with eye safety requirements or not.

Moreover, the ToF system or apparatus may include circuitry, including the control discussed herein, for processing and analyzing the detection signals generated upon detection of light and it may be configured to control the ToF apparatus or system accordingly as discussed herein (and/or the control is configured accordingly). The ToF system (apparatus) may provide a distance measurement, may scan a region of interest and may provide depth maps/images or the like from the region of interest.

The ToF apparatus or system may be used in different technology applications, such as in Automotive, Gaming applications (e.g. gesture detection), as well as in smart phones or other electronic devices, such as computers, laptops, or in medical device, etc.

In the following, examples are explained under reference of FIGS. 2 to 5, where the basic idea of FIG. 1 is applied without involving active light time intervals, in order to explain basic principles which can be applied to embodiments of the present disclosure.

Figure 2:
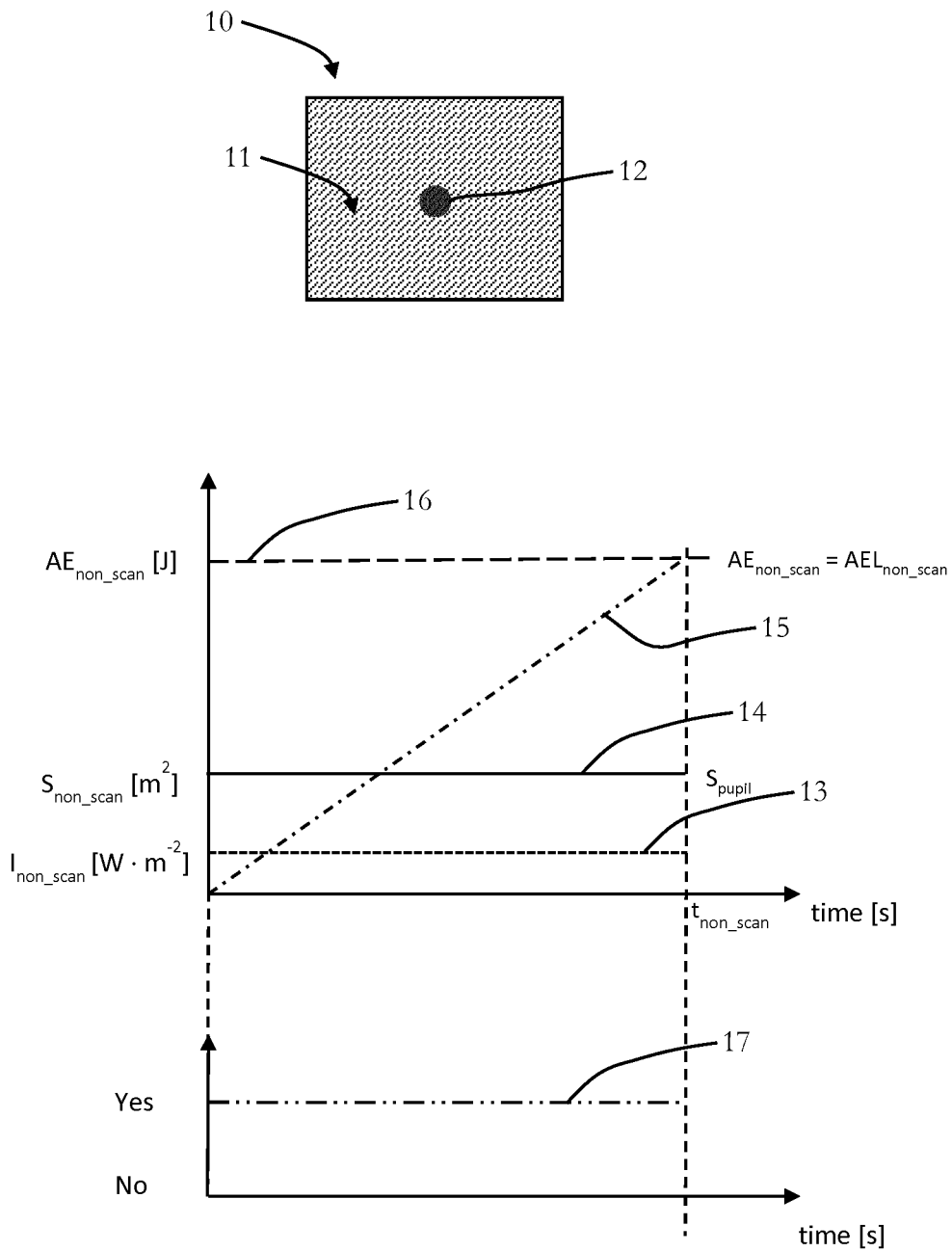
FIG. 2 illustrates an example for illuminating a scene.

In FIG. 2 pertains to a reference example, which is considered to comply with eye safety requirements (based on case 1 of FIG. 1) and it shows, in an upper side, a scene 10 is illustrated, wherein the scene 10 is illuminated with a full field continuous illumination without scanning (also referred to as "non scanning"). The scene 10 is illuminated with light 11 and for illustration purposes, in the middle of the scene 10 an eye safety standard pupil 12 is shown.

The size of the field of illumination (FOI) is defined by:

$$FOI[m^2] = h_{FOI} * v_{FOI},$$

wherein $h_{FOI}$ is the width of the FOI and $v_{FOI}$ is the height of the FOI.

The surface area of the eye safety pupil is defined by:

$$S_{pupil}[m^2] = \pi * (d_{pupil} * 2^{-1})^2,$$

wherein the $d_{pupil}$ is the diameter of the eye safety standard pupil.

The surface of the pupil $S_{non\_scan}[m^2]$ which is illuminated by the light source (e.g. the light beam emitted by the light source) is equal to the pupil surface area $S_{pupil}$, since in this case the emitted light beam illuminates the whole scene which is larger than the pupil.

The peak optical power $[W] = P_{non\_scan}$, wherein $P_{non\_scan}$ is the power of the emitted light.

The optical power intensity $[Wm^{-2}]=I_{non\_scan}$, wherein $I_{non\_scan}$ is the light intensity of the light emitted to the scene 10.

On the lower side of FIG. 2, a diagram is illustrated which shows on the ordinate a light intensity and on the abscissa the time from zero to a time $t_{non\_scan}$, which corresponds to one time frame (without limiting the present invention in that regard), wherein one frame is needed for illumination the whole scene 10.

The illumination procedure of FIG. 2 basically corresponds to case 1 of FIG. 1, which has been explained above.

The light source is active during the whole frame and it provides continuously the light intensity $I_{non\_scan}[Wm^{-2}]$, as is also illustrated as linear curve 13.

Moreover, a curve 14 represents the illuminated pupil surface $S_{non\_scan}[m^2]$ of the pupil surface $S_{pupil}$ which is illuminated during the frame, which is also constant in this example.

A curve 15 represents the accessible light energy "AE" during the frame, which linearly increases, since it shows the accumulated light energy over the time.

A horizontal line 16 shows the total accumulated light energy $AE_{non\_scan}$ over the whole frame and, thus, its value corresponds to the end value of the curve 15.

In the present example, the total energy $AE_{non\_scan}$ corresponds to the value $AEL_{non\_scan}$ for the frame, which represents the limit of the accessible energy for the eye safety standard pupil. In this example, the most limiting value AEL is the defined by the pupil exposure time $t_{non\_scan}$.

In a lower section of the diagram of FIG. 2, a curve 17 illustrates the state of the light detection and whether the flow electrons from the photodiode of the pixels of the light detector is allowed to flow to their storage nodes. In the case of curve 17, the state is "yes" for the whole frame.

Figure 3:
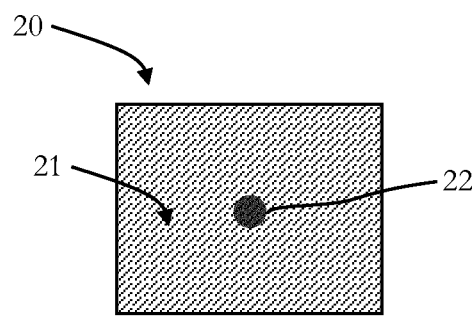
FIG. 3 illustrates an example for applying a reduced illumination time.
Figure 3:
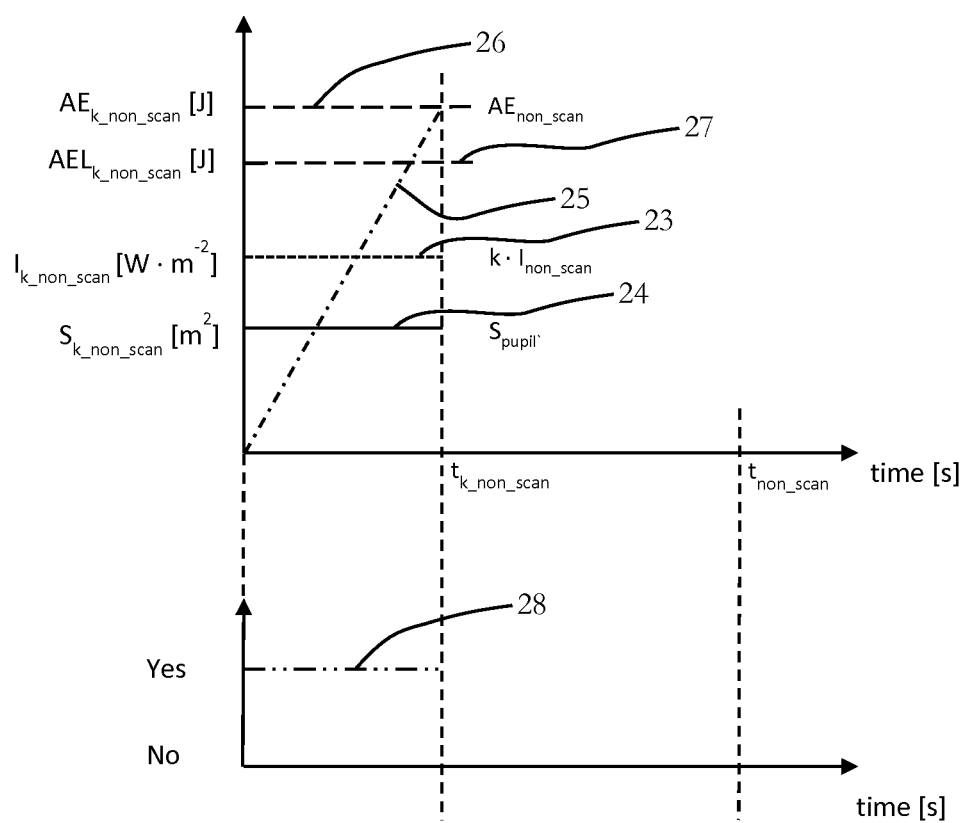

In the example of FIG. 3, in an upper side, as also explained for FIG. 2, a scene 20 is illustrated, wherein the scene 20 is illuminated with a full field continuous illumination without scanning (also referred to as "non scanning"), wherein this example corresponds to case 2 of FIG. 1, wherein the light is emitted for a part "k" of the whole frame. The scene 20 is illuminated with light 21 and for illustration purposes, in the middle of the scene 20 the eye safety standard pupil 22 is shown.

The size of the field of illumination (FOI) is defined by:

$$FOI[m^2]=h_{FOI}*v_{FOI},$$

wherein $h_{FOI}$ is the width of the FOI and $v_{FOI}$ is the height of the FOI.

The surface area of the eye safety pupil is defined by:

$$S_{pupil}[m^2]=\pi*(d_{pupil}*2^{-1})^2,$$

wherein the $d_{pupil}$ is the diameter of the eye safety standard pupil.

The surface of the pupil $S_{non\_scan}[m^2]$ which is illuminated by the light source (e.g. the light beam emitted by the light source) is equal to the pupil surface area $S_{pupil}$, since in this case the emitted light beam illuminates the whole scene which is larger than the pupil.

The peak optical power $[W]=P_{k\_non\_scan}=k*P_{non\_scan}$, wherein $P_{non\_scan}$ is the power of the emitted light during the time $t_{k\_non\_scan}$, which is the k-th part of the time frame having the length $t_{non\_scan}$, i.e. $t_{k\_non\_scan}=t_{non\_scan}*k^{-1}$.

The optical power intensity $[Wm^{-2}]=I_{k\_non\_scan}=k*I_{non\_scan}$, wherein $I_{non\_scan}$ is the light intensity of the light emitted to the scene 20 during the time $t_{k\_non\_scan}$.

On the lower side of FIG. 3, a diagram is illustrated which shows on the ordinate a light intensity and on the abscissa the time from zero to a time $t_{non\_scan}$, which corresponds to one time frame (without limiting the present invention in that regard), wherein the light source is only active for the time $t_{k\_non\_scan}$.

The light source, which is active during $t_{k\_non\_scan}$ of the frame, provides continuously the light intensity $I_{non\_scan}$ $[Wm^{-2}]$, as is also illustrated as linear curve 23.

Moreover, a curve 24 represents the illuminated pupil surface $S_{k\_non\_scan}[m^2]$ of the pupil surface $S_{pupil}$ which is illuminated during the time $t_{k\_non\_scan}$, which is also constant in this example.

A curve 25 represents the accessible light energy "AE" during the frame, which linearly increases, since it shows the accumulated light energy over the time until $t_{k\_non\_scan}$.

A horizontal line 26 shows the total accumulated total light energy $AE_{k\_non\_scan}$ over the whole frame and, thus, its value corresponds to the end value of the curve 25.

In the present example, the total energy $AE_{k\_non\_scan}$ is higher than the value of $AEL_{k\_non\_scan}$, which is illustrated as curve 27 and which represents the limit of the accessible energy for the eye safety standard pupil during the time interval $t_{k\_non\_scan}$. The exposure time $t_{k\_non\_scan}$ for the pupil is reduced to a k-th part of the frame and simultaneously the peak optical power intensity is increased k times. The total active illumination captured by each pixel of the light detector is kept the same as in the reference design of FIG. 1. However, a decrease in the exposure time reduces the AEL, such that the example of FIG. 3 is not eye safe, i.e. $AE_{k\_non\_scan}>AEL_{k\_non\_scan}$.

In a lower section of the diagram of FIG. 3, a curve 28 illustrates the state of the light detection and whether the flow electrons from the photodiode of the pixels of the light detector is allowed to flow to their storage nodes. In the case of curve 28, the state is "yes" for the exposure time $t_{k\_non\_scan}$ during which the light source is active.

Figure 4:
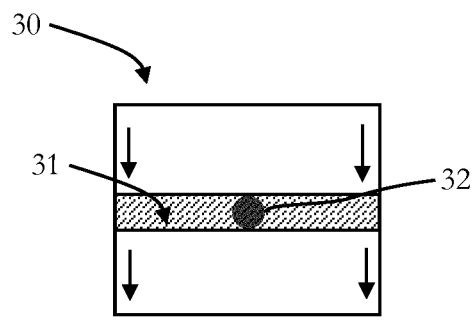
FIG. 4 illustrates an example for applying a reduced illumination time, wherein a light beam has a height corresponding to a diameter of a pupil.
Figure 4:
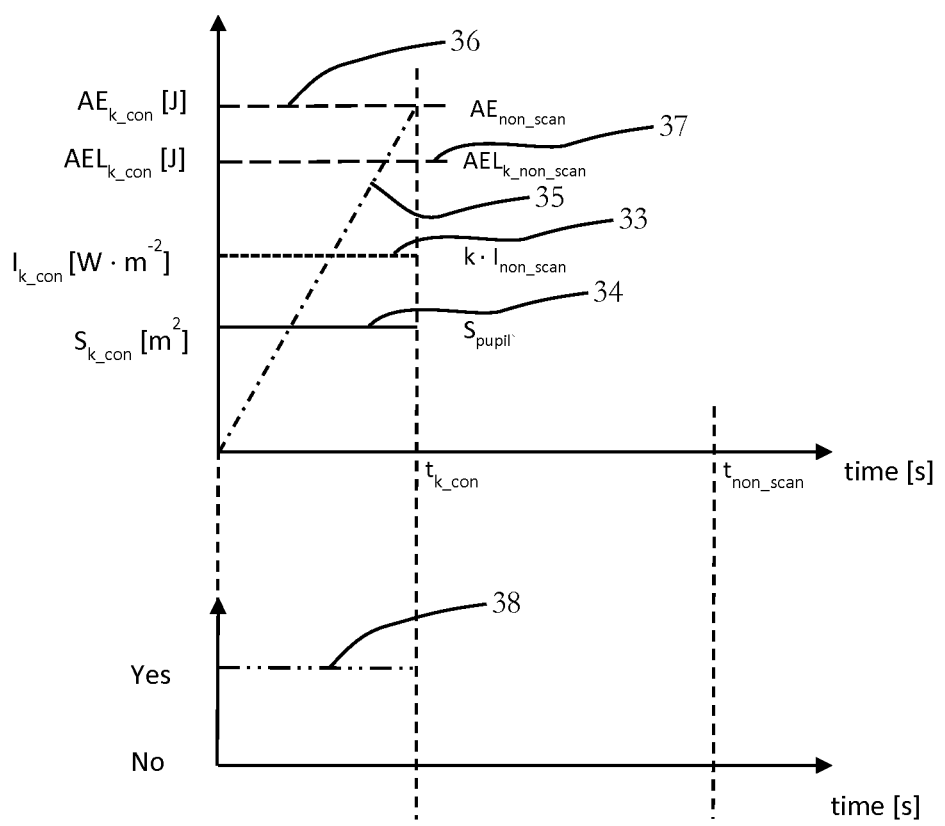

In the example of FIG. 4, in an upper side, a scene 30 is illustrated, wherein the scene 30 is illuminated with 1D and k consecutive step-line scanning process, wherein the light is emitted for a part "k" of the whole frame. The scene 30 is illuminated with light 31 and for illustration purposes, in the middle of the scene 30 the eye safety standard pupil 32 is shown.

Each beam emitted by the light source has a height which is equal to the diameter $d_{pupil}$ of the pupil 32, wherein by illuminating the scene 30 k-times, wherein adjacent areas of the scene 30 are illuminated, the whole scene 30 is illuminated.

Hence, $k=v_{FOI}*d_{pupil}^{-1}$, wherein $v_{FOI}$ corresponds to the height of the field of illumination (FOI) corresponding to the height of the scene 30.

The size of the field of illumination FOI for one (k-th) illumination is defined by:

$$FOI_{k\_con}[m^2]=h_{FOI}*d_{pupil},$$

wherein $h_{FOI}$ is the width of the FOI.

The whole FOI (after k scanning steps) is:

$$FOI[m^2]=k*FOI_{k\_con}.$$

The surface area of the eye safety pupil is defined by:

$$S_{pupil}[m^2]=\pi*(d_{pupil}*2^{-1})^2,$$

wherein the $d_{pupil}$ is the diameter of the eye safety standard pupil.

The peak optical power $[W]=P_{k\_con}=P_{non\_scan}$, wherein $P_{non\_scan}$ is the power of the emitted light during the time $t_{k\_con}$, which is the k-th part of the time frame having the length $t_{non\_scan}$, i.e. $t_{k\_con}=t_{non\_scan}*k^{-1}$.

The optical power intensity $[Wm^{-2}]=I_{k\_con}=k*I_{non\_scan}$, wherein $I_{non\_scan}$ is the light intensity of the light emitted to the scene 30 during the time $t_{k\_con}$.

On the lower side of FIG. 4, a diagram is illustrated which shows on the ordinate a light intensity and on the abscissa the time from zero to a time $t_{non\_scan}$, which corresponds to one time frame (without limiting the present invention in that regard), wherein the light source is only active for the time $t_{k\_con}$.

The light source, which is active during $I_{k\_con}$ of the frame, provides continuously the light intensity $I_{k\_con}$ $[Wm^{-2}]$, as is also illustrated as linear curve 33.

Moreover, a curve 34 represents the illuminated pupil surface $S_{k\_con}[m^2]$ of the pupil surface $S_{pupil}$ which is illuminated during the time $t_{k\_con}$, which is also constant in this example, since the emitted light beam has a height corresponding to the diameter of the pupil 32, such that it is fully illuminated.

A curve 35 represents the accessible light energy "AE" during the frame, which linearly increases, since it shows the accumulated light energy over the time until $t_{k\_con}$.

A horizontal line 36 shows the total accumulated total light energy $AE_{k\_con}$ over the whole frame and, thus, its value corresponds to the end value of the curve 35.

In the present example, the total energy $AE_{k\_con}$ is higher than the value of $AEL_{k\_con}$, which is illustrated as curve 37 and which represents the limit of the accessible energy for the eye safety standard pupil during the time interval $t_{k\_con\_scan}$. The exposure time $t_{k\_con}$ for the pupil is reduced to a k-th part of the frame and simultaneously the peak optical power intensity is increased k times by focusing the light into the small beam having the height of the diameter of the pupil. The total active illumination captured by each pixel of the light detector is kept the same as in the reference design of FIG. 1. However, a decrease in the exposure time reduces the AEL, such that the example of FIG. 4 is not eye safe, i.e. $AE_{k\_con}>AEL_{k\_con}$.

In a lower section of the diagram of FIG. 4, a curve 38 illustrates the state of the light detection and whether the flow electrons from the photodiode of the pixels of the light detector is allowed to flow to their storage nodes. In the case of curve 38, the state is "yes" for the exposure time $t_{k\_con}$ during which the light source is active.

Figure 5:
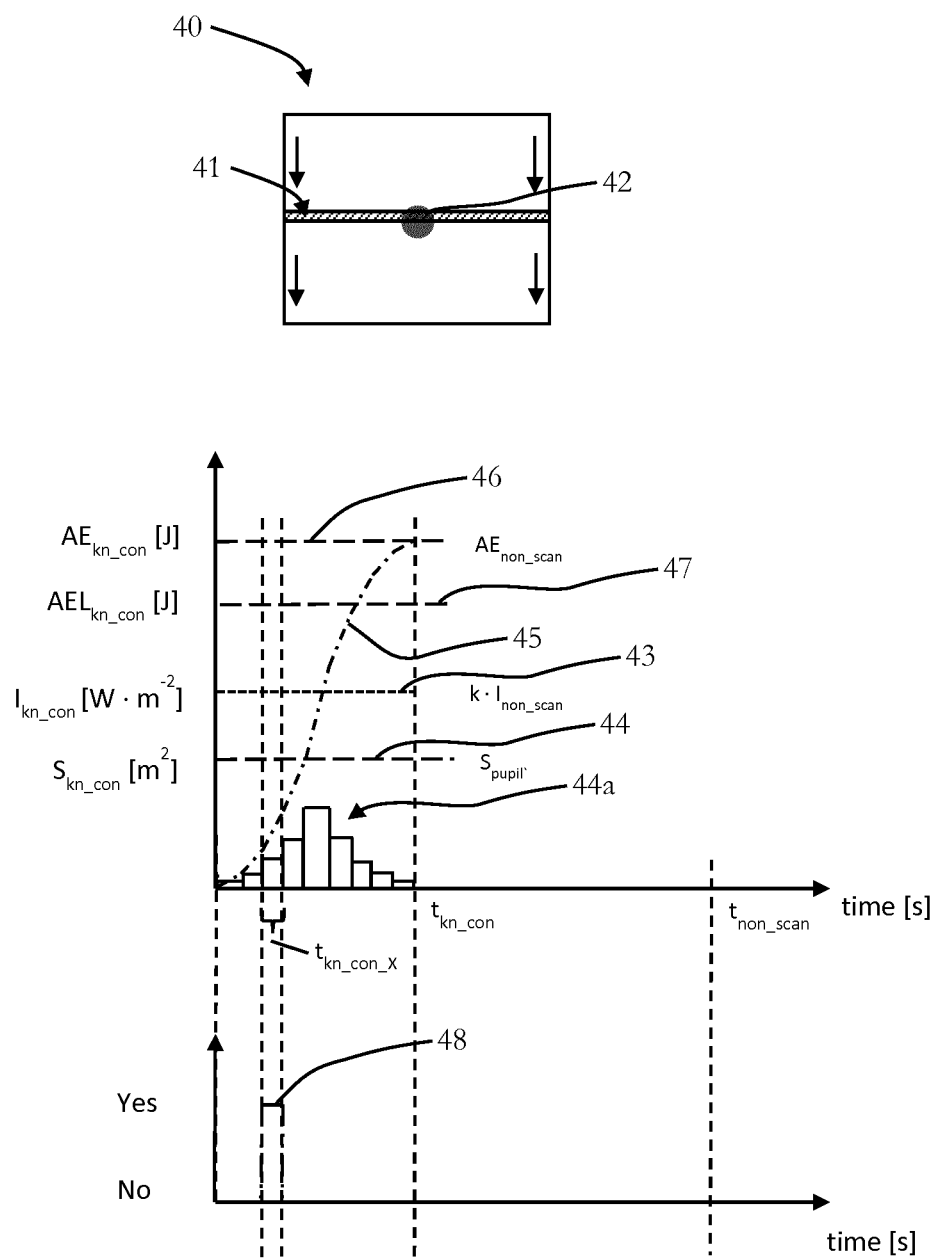
FIG. 5 illustrates an example for applying a reduced illumination time, wherein a beam has a height which is smaller than a diameter of a pupil.

In the example of FIG. 5, in an upper side, a scene 40 is illustrated, wherein the scene 40 is illuminated with 1D and kn consecutive step-line scanning process, wherein the light is emitted for a part "k" of the whole frame. The scene 40 is illuminated with light 41 and for illustration purposes, in the middle of the scene 40 the eye safety standard pupil 42 is shown.

Each beam emitted by the light source has a height which is equal to an n-th part of the diameter $d_{pupil}$ of the pupil 42, wherein by illuminating the scene 40 n-times, wherein adjacent areas of the scene 40 are illuminated, the diameter of the pupil 42 is illuminated and by illumination kn-times the scene 40, the whole scene is illuminated, i.e. the scene 40 is divided into k-stripes, wherein each of the k-stripes is divided into n-stripes, wherein the height of a k-stripe corresponds to the diameter of the pupil 42 (similarly to the example of FIG. 4).

The height, as mentioned, of each beam line $[m]=d_{pupil}*n^{-1}$.

Hence, $k=v_{FOI}*d_{pupil}^{-1}$, wherein $v_{FOI}$ corresponds to the height of the field of illumination (FOI) corresponding to the height of the scene 40.

The size of the field of illumination FOI for one (kn-th) illumination is defined by:

$$FOI_{kn\_con}[m^2]=h_{FOI}*d_{pupil}*n^{-1},$$

wherein $h_{FOI}$ is the width of the FOI.

The whole FOI (after kn scanning steps) is:

$$FOI[m^2]=k*n*FOI_{kn\_con}.$$

The surface area of the eye safety pupil is defined by:

$$S_{pupil}[m^2]=\pi*(d_{pupil}*2^{-1})^2,$$

wherein the $d_{pupil}$ is the diameter of the eye safety standard pupil.

The peak optical power $[W]=P_{kn\_con}=P_{non\_scan}$, wherein $P_{non\_scan}$ is the power of the emitted light during the time $t_{kn\_con}$, wherein $t_{kn\_con}=t_{non\_scan}*k^{-1}=t_{kn\_con\_X}*n$ (see lower side of FIG. 5).

The optical power intensity $[Wm^{-2}]=I_{kn\_con}=k*I_{non\_scan}$, wherein $I_{non\_scan}$ is the light intensity of the light emitted to the scene 40 during the time $t_{kn\_con}$.

On the lower side of FIG. 5, a diagram is illustrated which shows on the ordinate a light intensity and on the abscissa the time from zero to a time $t_{non\_scan}$, which corresponds to one time frame (without limiting the present invention in that regard), wherein the light source is only active for the time $t_{kn\_con}$.

The light source, which is active during $t_{kn\_con}$ of the frame, provides continuously the light intensity $I_{kn\_con}$ $[Wm^{-2}]$, as is also illustrated as linear curve 43.

Moreover, a curve 44 represents the accumulated illuminated pupil surface $S_{kn\_con}[m^2]$ the pupil surface $S_{pupil}$ which is illuminated during the time $t_{kn\_con}$, wherein the distribution 44a illustrates the illuminated pupil surface for consecutive time intervals of $t_{kn\_con\_X}$, i.e. for each of an n-th illumination of the pupil 42.

A curve 45 represents the accessible light energy "AE" during the frame for the pupil 42, which not linearly increases.

A horizontal line 46 shows the total accumulated light energy $AE_{kn\_con}$ over the whole frame and, thus, its value corresponds to the end value of the curve 45 (at $t_{kn\_con}$, since after that pint of time, the illumination is off and not active).

In the present example, the total energy $AE_{kn\_con}$ which is determined for the beams illumination the pupil 42 is higher than the value of $AEL_{kn\_con}$, which is illustrated as curve 47 and which represents the limit of the accessible energy for the eye safety standard pupil during the time interval $t_{k\_con\_scan}$. The exposure time $t_{kn\_con}$ for the pupil is reduced to a k-th part of the frame and simultaneously the peak optical power intensity is increased k times by focusing the light into the small beam. The total active illumination captured by each pixel of the light detector is kept the same as in the reference design of FIG. 1. However, a decrease in the exposure time reduces the AEL, such that the example of FIG. 5 is not eye safe, i.e. $AE_{kn\_con}>AEL_{kn\_con}$.

In a lower section of the diagram of FIG. 5, a curve 48 illustrates the state of the light detection and whether the flow electrons from the photodiode of the pixels of the light detector is allowed to flow to their storage nodes. In the case of curve 48, the state is exemplary "yes" for the exposure time $t_{kn\_con\_X}$ during which the light source is active and which corresponds to the exemplary position of the light beam which is also shown in the upper part. Each pixel is synchronized with the light source (e.g. illumination scanner).

In the following, embodiments of the present disclosure are discussed under reference of FIGS. 6 to 11. In the embodiments discussed, for illustration purposes, 1D scanning is assumed without limiting the present disclosure in that regard, and, also 2D scanners (or other scanning methods) may be implement or the like. Furthermore the present disclosure is not limited to concrete examples, which may be given in the following description, such as a wavelength of 850 nm and a burst duration greater than 5·10−6 [s]. For a different wavelength and/or a different burst duration, different AEL may apply, and the skilled person will appreciate that the principle of spread step scanning and multiple-passes can be applied to different AEL values by adjusting and/or modifying the relation between the affected parameters discussed.

FIG. 6 illustrates an embodiment, which is based to some extend of the example of FIG. 3. However, in this embodiment, additional active light time intervals are introduced.

In an upper section a), FIG. 6 illustrates a scene 50, wherein the scene 50 is illuminated with a non-scanning, but p-passes illumination process (in addition to the k-passes explained under reference of FIG. 3), wherein the light is emitted for a total part "k" of the whole frame, but the part "k" (as of FIG. 3) is further divided into p-passes. The scene 50 is illuminated with light 51 and for illustration purposes, in the middle of the scene 50 the eye safety standard pupil 52 is shown.

In this embodiment, a non-scanning p-passes process is provided, wherein the eye safety is achieved, and where the SNR is improved by reducing the exposure time while keeping the same amount of active illumination, compared to FIG. 2. In this embodiment, the same illumination time is used as in FIG. 3, but it is spread in p-passes. The total time needed for acquiring a frame is $t_{non\_scan}$, as also discussed above. In this embodiment, the number of passes p depends on: the k parameter, the burst duration $t_{k\_non\_scan\_p\_X}$, the light source design (e.g. laser design), and the eye safety standard. In this embodiment, the most limiting AEL is $AEL_{k\_non\_scan\_p\_X}$, the one determined by the pupil exposure time $t_{k\_non\_scan\_p\_X}$ during one p-pass, such that the access energy $AE_{k\_non\_scan\_p\_X}$ is measured by using one p-pass. For instance, applying the eye safety standard IEC 60825-1 ed. 3, 2014, for an extended source laser with wavelength of 850 nm, and a burst duration greater than 5·10−6 [s], the relation to keep this embodiment eye safe is $p=k^3$.

In more detail:

The size of the field of illumination (FOI) is defined by:

$$FOI[m^2]=h_{FOI}*v_{FOI},$$

wherein $h_{FOI}$ is the width of the FOI and $v_{FOI}$ is the height of the FOI.

The surface area of the eye safety pupil is defined by:

$$S_{pupil}[m^2]=\pi*(d_{pupil}*2^{-1})^2,$$

wherein the $d_{pupil}$ is the diameter of the eye safety standard pupil.

The surface of the pupil $S_{non\_scan}[m^2]$ which is illuminated by the light source (e.g. the light beam emitted by the light source) is equal to the pupil surface area $S_{pupil}$, since in this case the emitted light beam illuminates the whole scene which is larger than the pupil.

The peak optical power $[W]=P_{k\_non\_scan\_p}=k*P_{non\_scan}$, wherein $P_{non\_scan}$ is the power of the emitted light during the time $t_{non\_scan}$.

The optical power intensity $[Wm^{-2}]=I_{k\_non\_scan\_p}=k*I_{non\_scan}$, wherein $I_{non\_scan}$ is the light intensity of the light emitted to the scene 50 during the time $t_{non\_scan}$.

For the time interval $t_{k\_non\_scan\_p}$, which corresponds to the k-th part of the time frame having the length $t_{non\_scan}$ the following applies:

$$t_{k\_non\_scan\_p}=t_{non\_scan}*k_{-1}=t_{k\_non\_scan\_p\_X}*p,$$

wherein $t_{k\_non\_scan\_p\_X}$ is the active light time interval of one p-pass.

On the lower side of FIG. 6, a section b) illustrates a diagram which shows on the ordinate a light intensity and on the abscissa the time from zero to a time $t_{non\_scan}$, which corresponds to one time frame (without limiting the present invention in that regard), wherein the light source is only active for the active light time intervals $t_{k\_non\_scan\_p\_X}$ also denoted with reference number 53.

In the present embodiment, the frame is divided into five active light time intervals 53 during which each the light source is active (i.e. number of passes p=5), wherein the regions 53 also indicate each that the pupil 52 is illuminated, i.e. $S_{k\_non\_scan\_p}[m^2]$.

The light source provides the light intensity $I_{k\_non\_scan\_P}$ $[Wm^{-2}]$, as is also illustrated as linear curve 54.

A curve 55 represents the accessible light energy "AE" during the frame for the pupil 52, which stepwise increases during each of the active light time intervals 53 with an amount of $AE_{k\_non\_scan\_p\_X}$.

A horizontal line 56 shows the total accumulated light energy $AE_{k\_non\_scan\_p}$ over the whole frame and, thus, over all p-passes, and its value corresponds to the end value of the curve 55 (at the end of the frame).

In the present embodiment, the total energy $AE_{k\_non\_scan\_p}$ is equal to the eye safety standard limit value $AEL_{k\_non\_scan\_p}$ for the pupil 52 and also to the $AEL_{non\_scan}$ and $AE_{non\_scan}$ of FIG. 2, and, thus, the embodiment is eye safe.

In a section c) of FIG. 6, the states of the light detection are illustrated and whether the flow electrons from the photodiode of the pixels of the light detector is allowed to flow to their storage nodes. For each interval 57, the state is exemplary "yes", which corresponds to an associated active light time interval 53, such that the activation of the light detector and of the light source is synchronized.

In a section d) of FIG. 6, time intervals 58 indicate draining of new generated electrons from the light detector by using an overflow gate of each of a pixel of the light detector. The time intervals 58 are provided between the intervals 53 and 57, respectively, i.e. the time intervals 58 correspond to the time intervals where the light source is not active.

Figure 7:
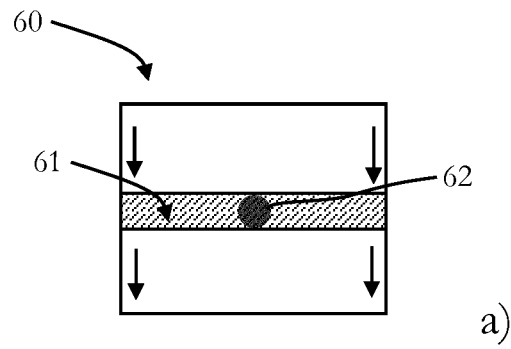
FIG. 7 illustrates another embodiment of illuminating a scene with several active light time intervals, wherein a light beam has a height corresponding to a diameter of a pupil.
Figure 7:
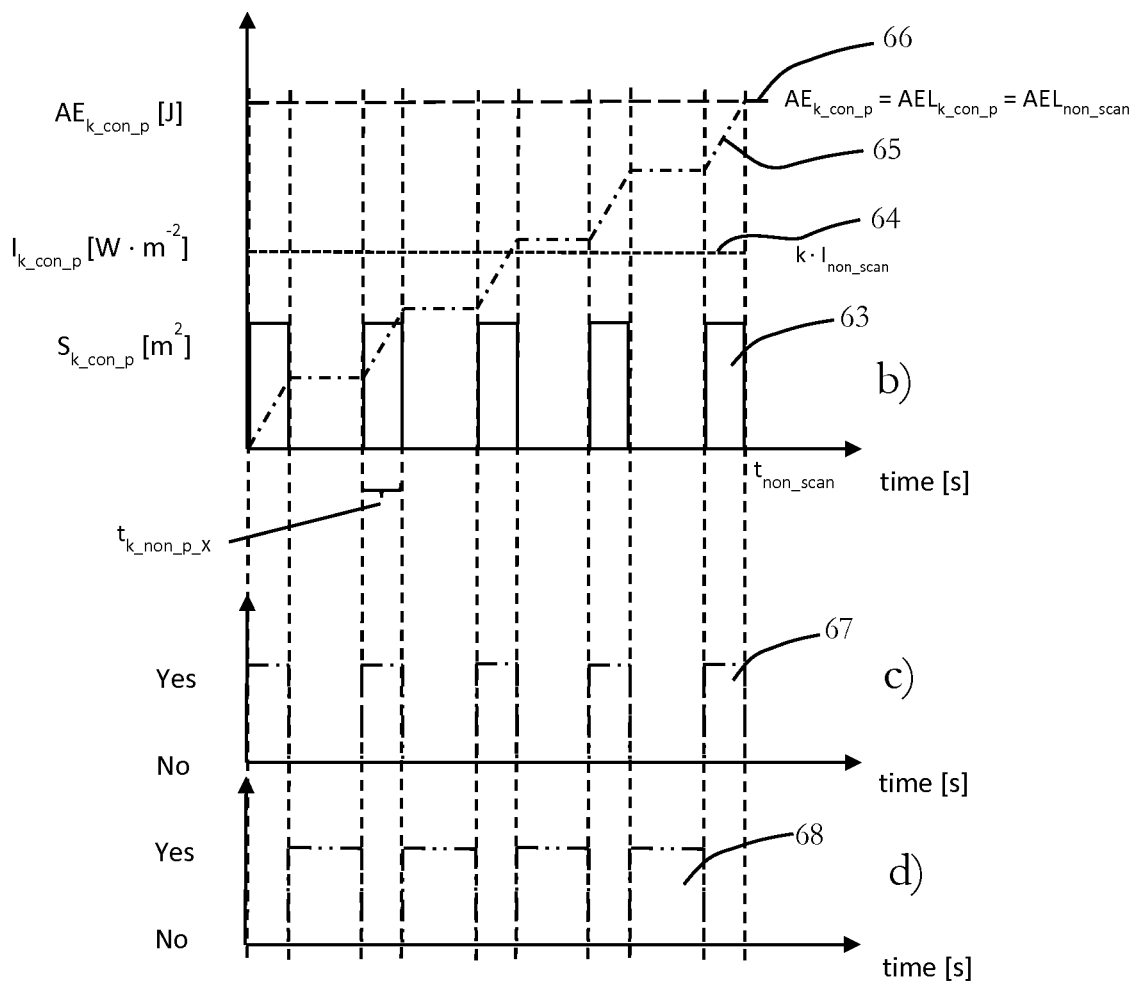

FIG. 7 illustrates an embodiment, which is based to some extend of the example of FIG. 4. However, in this embodiment, additional active light time intervals are introduced.

In an upper section a), FIG. 7 illustrates a scene 60, wherein the scene 60 is illuminated with 1D and k consecutive step-line scanning process including p-passes. The scene 60 is illuminated with light 61 and for illustration purposes, in the middle of the scene 60 the eye safety standard pupil 62 is shown.

In the present embodiment, eye safety is achieved, and the SNR is improved by reducing the exposure time while keeping the same amount of active illumination, compared to the example of FIG. 2. This embodiment uses the same illumination time as used in the example of FIG. 4 by spreading the total illumination energy in p-passes. The total time needed for acquiring a frame is $t_{non\_scan}$. The number of passes depends on: the k parameter, the burst duration $t_{k\_con\_p\_X}$, the light source desing (e.g. laser design), and the eye safety standard. In this embodiment, the most limiting AEL is $AEL_{k\_con\_p\_X}$, the one determined by the pupil exposure time $t_{\_k\_con\_p\_X}$. The $AE_{k\_con\_p\_X}$ is measured based on one pass of a pupil-centered beam. For instance, applying the eye safety standard IEC 60825-1 ed. 3, 2014, for an extended source laser with wavelength of 850 nm, and a burst duration greater than $5\cdot10^{-6}$ [s], the relation to keep for making this embodiment eye safe is $p=k^3$.

Each beam emitted by the light source has a height which is equal to the diameter $d_{pupil}$ of the pupil 52, wherein by illuminating the scene 60 k-times, wherein adjacent areas of the scene 60 are illuminated, the whole scene 60 is illuminated, and wherein each of the k-times illuminations is divided into p-passes.

Hence, $k=v_{FOI}*d_{pupil}^{-1}$, wherein $v_{FOI}$ corresponds to the height of the field of illumination (FOI) corresponding to the height of the scene 60.

The size of the field of illumination FOI for one (k-th) illumination is defined by:

$$FOI_{k\_con\_p}[m^2]=h_{FOI}*d_{pupil},$$

wherein $h_{FOI}$ is the width of the FOI.

The whole FOI (after k scanning steps) is:

$$FOI[m^2]=k*FOI_{k\_con\_p},$$

The surface area of the eye safety pupil is defined by:

$$S_{pupil}[m^2]=\pi*(d_{pupil}*2^{-1})^2,$$

wherein the $d_{pupil}$ is the diameter of the eye safety standard pupil.

The peak optical power $[W]=P_{k\_con\_p}=P_{non\_scan}$, wherein $P_{non\_scan}$ is the power of the emitted light during the time $t_{k\_con}$, which is the k-th part of the time frame having the length $t_{non\_scan}$, i.e. $t_{k\_con}=t_{non\_scan}*k^{-1}$.

The optical power intensity $[Wm^{-2}]=k*I_{non\_scan}$, wherein $I_{non\_scan}$ is the light intensity of the light emitted to the scene 60 during the time $t_{k\_con\_p}$.

The time $t_{k\_con\_p}=t_{non\_scan}*k^{-1}t_{k\_con\_p\_X}*p$.

On the lower side of FIG. 7, a section b) illustrates a diagram which shows on the ordinate a light intensity and on the abscissa the time from zero to a time $t_{non\_scan}$, which corresponds to one time frame (without limiting the present invention in that regard), wherein the light source is only active for the active light time intervals $t_{k\_con\_p\_X}$ also denoted with reference number 63.

In the present embodiment, the frame is divided into five active light time intervals 63 during which each the light source is active (i.e. number of passes p=5), wherein the regions 63 also indicate each that the pupil 62 is illuminated, i.e. $S_{k\_con\_p}[m^2]$.

The light source provides the light intensity $I_{k\_con\_p}$ $[Wm^{-2}]$, as is also illustrated as linear curve 64.

A curve 65 represents the accessible light energy "AE" during the frame for the pupil 62, which stepwise increases during each of the active light time intervals 63 with an amount of $AE_{k\_con\_p\_X}$.

A horizontal line 66 shows the total accumulated light energy $AE_{k\_con\_p}$ over the whole frame and, thus, over all p-passes, and its value corresponds to the end value of the curve 65 (at the end of the frame).

In the present embodiment, the total energy $AE_{k\_con\_p}$ is equal to the eye safety standard limit value $AEL_{k\_con\_p}$ for the pupil 62 and also to the $AEL_{non\_scan}$ and $AE_{non\_scan}$ of FIG. 2, and, thus, the embodiment is eye safe.

In a section c) of FIG. 7, the states of the light detection are illustrated and whether the flow electrons from the photodiode of the pixels of the light detector is allowed to flow to their storage nodes. For each interval 67, the state is exemplary "yes", which corresponds to an associated active light time interval 63, such that the activation of the light detector and of the light source is synchronized.

In a section d) of FIG. 7, time intervals 68 indicate draining of new generated electrons from the light detector by using an overflow gate of each of a pixel of the light detector. The time intervals 68 are provided between the intervals 63 and 67, respectively, i.e. the time intervals 68 correspond to the time intervals where the light source is not active.

Figure 8:
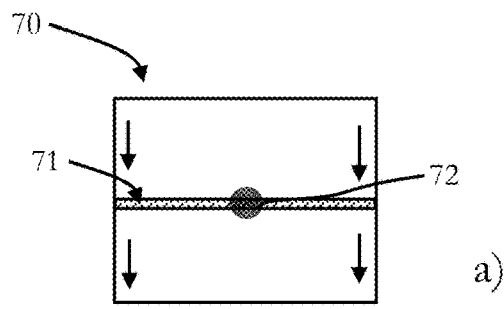
FIG. 8 illustrates another embodiment of illuminating a scene with several active light time intervals, wherein a light beam has a height, which is smaller than a diameter of a pupil.
Figure 8:
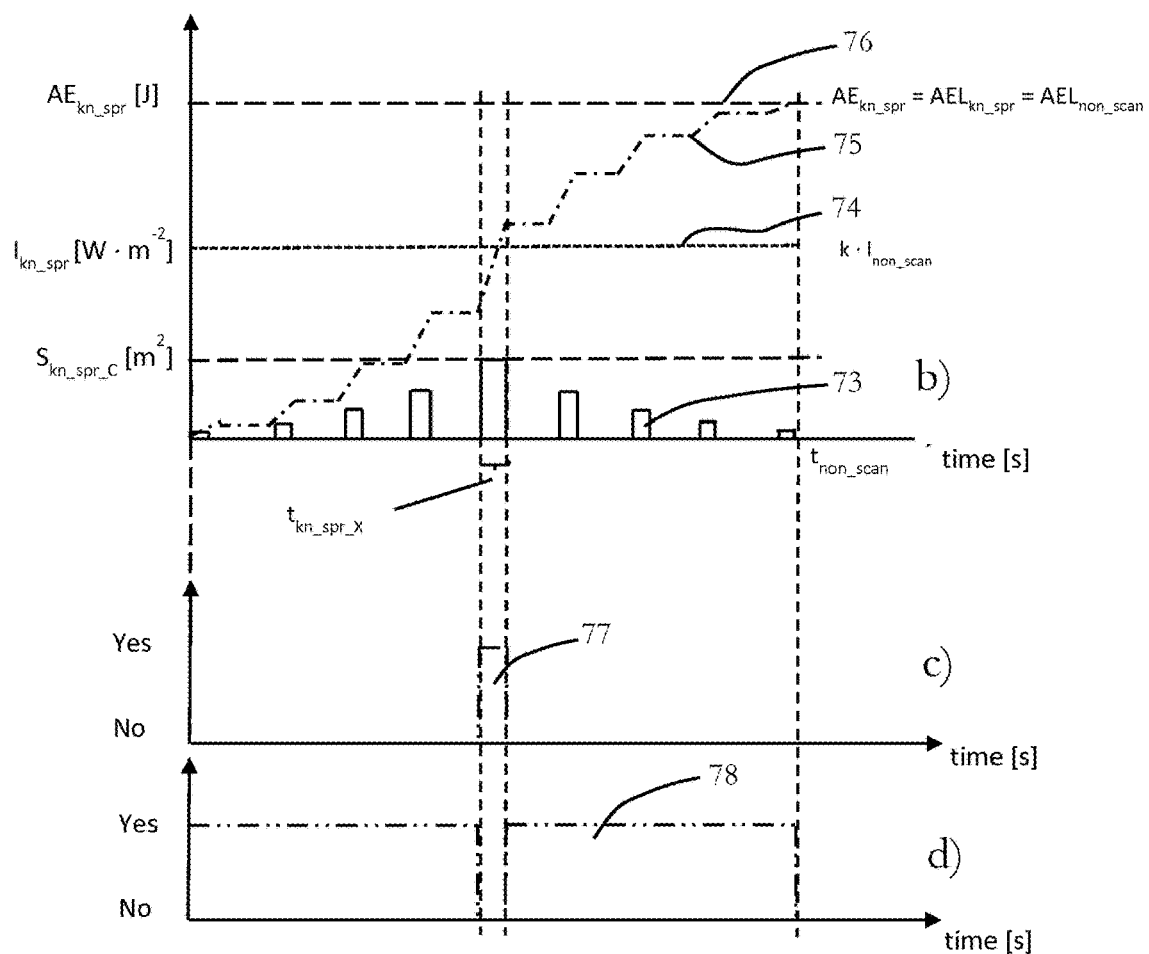

FIG. 8 illustrates an embodiment, which is based to some extend of the example of FIG. 5. However, in this embodiment, additional active light time intervals are introduced.

In an upper section a), FIG. 8 illustrates a scene 70, wherein the scene 70 is illuminated with 1D and kn consecutive step-line scanning, wherein the light is emitted for a part "k" of the whole frame. The scene 70 is illuminated with light 71 and for illustration purposes, in the middle of the scene 70 the eye safety standard pupil 72 is shown.

Each beam emitted by the light source has a height which is equal to an n-th part of the diameter $d_{pupil}$ of the pupil 72, wherein by illuminating the scene 70 n-times, wherein adjacent areas of the scene 70 are illuminated, the diameter of the pupil 72 is illuminated and by illumination kn-times the scene 70, the whole scene is illuminated, i.e. the scene 70 is divided into k-stripes, wherein each of the k-stripes is divided into n-stripes, wherein the height of a k-stripe corresponds to the diameter of the pupil 72 (similarly to the example of FIG. 4 and the embodiment of FIG. 7, respectively). Each n-stripe is associated with an active light time interval, such that the n-illuminations are spread in time over the frame.

In this embodiment, providing the 1D kn spread step-line scanning, eye safety is achieved and the SNR is improved by reducing the exposure time while keeping the same amount of active illumination, compared to FIG. 2. This embodiment uses the same illumination time used in the example of FIG. 5 by spreading the total illumination energy that falls in each pixel (in this example, in each row of pixels). The total time needed for acquiring a frame is $t_{non\_scan}$. The relation of k and n depends on:

the burst duration $t_{\_kn\_spr\_X}$, the light source design (e.g. the laser design), and the eye safety standard. In this embodiment, the most limiting AEL is $AEL_{kn\_spr\_X}$, the one determined by the pupil exposure time $t_{\_kn\_spr\_X}$. The $AE_{kn\_spr\_C}$ is measured based on a pupil-centered beam. For instance, applying the eye safety standard IEC 60825-1 ed. 3, 2014, for an extended source laser with wavelength of 850 nm, and a burst duration greater than $5\cdot10^{-6}$ [s], the relation to keep for making this design eye safe is $q_n^{-1}\cdot n^{1/4}\cdot k^{-3/4}=1$, being $q_n$ the (n-th) portion of the eye safety pupil 72 illuminated by the central beam.

The height of beam line=$d_{pupil}*n^{-1}$.

Hence, $k=v_{FOI}*d_{pupil}^{-1}$, wherein $v_{FOI}$ corresponds to the height of the field of illumination (FOI) corresponding to the height of the scene 60.

The size of the field of illumination FOI for one (k-th) illumination is defined by:

$$FOI_{kn\_spr}[m^2]h_{FOI}*d_{pupil}*n^{-1},$$

wherein $h_{FOI}$ is the width of the FOI.

The whole FOI (after k scanning steps) is:

$$FOI[m^2]=k*n*FOI_{kn\_spr}.$$

The surface area of the eye safety pupil is defined by:

$$S_{pupil}[m^2]=\pi*(d_{pupil}*2^{-1})^2,$$

wherein the $d_{pupil}$ is the diameter of the eye safety standard pupil.

The peak optical power $[W]=P_{kn\_spr}=P_{non\_scan}$, wherein $P_{non\_scan}$ is the power of the emitted light during the frame.

The optical power intensity $[Wm^{-2}]=I_{kn\_spr}=k*I_{non\_scan}$, wherein $I_{non\_scan}$ is the light intensity of the light emitted to the scene 70 during the frame.

The time $t_{kn\_spr}=t_{non\_scan}*k^{-1}=t_{kn\_spr\_X}*n$.

On the lower side of FIG. 8, a section b) illustrates a diagram which shows on the ordinate a light intensity and on the abscissa the time from zero to a time $t_{non\_scan}$, which corresponds to one time frame (without limiting the present invention in that regard), wherein the light source is only active for the active light time intervals $t_{kn\_spr\_X}$ also denoted with reference number 73.

In the present embodiment, the frame is divided into nine active light time intervals 73 during which each the light source is active (i.e. number of active light time intervals=9), wherein the regions 73 also indicate each that the pupil 72 is illuminated, i.e. $S_{kn\_spr\_C}[m^2]$ corresponds to the area illuminated by a pupil-centered beam. Hence, the surface of the pupil 72 is not illuminated fully, but only after n illuminations, the pupil 72 is fully illuminated.

The light source provides the light intensity $I_{kn\_spr}[Wm^{-2}]$, as is also illustrated as linear curve 74.

A curve 75 represents the accessible light energy "AE" during the frame for the pupil 72, which stepwise increases during each of the active light time intervals 73 with an amount which is not constant.

A horizontal line 76 shows the total accumulated light energy $AE_{kn\_spr}$ over the whole frame and, thus, over all n-passes, and its value corresponds to the end value of the curve 75 (at the end of the frame).

In the present embodiment, the total energy $AE_{kn\_spr}$ is equal to the eye safety standard limit value $AEL_{kn\_spr}$ for the pupil 72 and also to the $AEL_{non\_scan}$ and $AE_{non\_scan}$ of FIG. 2. Then, if it is achieved that $AE_{kn\_spr\_C}$ is smaller than or equal to $AEL_{kn\_spr\_X}$ as explained above, the embodiment is eye safe.

In a section c) of FIG. 8, the states of the light detection are illustrated and whether the flow electrons from the photodiode of the pixels of the light detector is allowed to flow to their storage nodes. For the interval 77, which is associated with a pixel, which in turn is associated with the central beam is illustrated in section a) and which is exemplary a beam running through the center of the pupil 72, the state is exemplary "yes", which corresponds to an associated active light time interval 73, such that the activation of the light detector (i.e. associated pixels) and of the light source (i.e. associated light beam) is synchronized.

In a section d) of FIG. 8, time intervals 78 indicate draining of new generated electrons from the light detector (i.e. of the pixel which is active in the interval 77 for the central light beam) by using an overflow gate of each of a pixel of the light detector. The time intervals 78 are provided outside the associated interval 77, i.e. the time intervals 78 correspond to the time intervals where the light source is not active for the pixel which is associated with the central beam of the light source.

Figure 9:
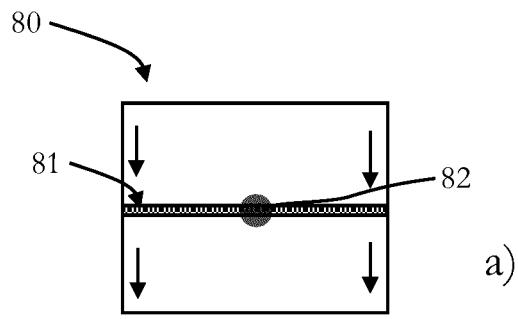
FIG. 9 illustrates another embodiment of illuminating a scene with several active light time intervals, which is based on a combination of the embodiment of FIG. 7 and FIG. 8.
Figure 9:
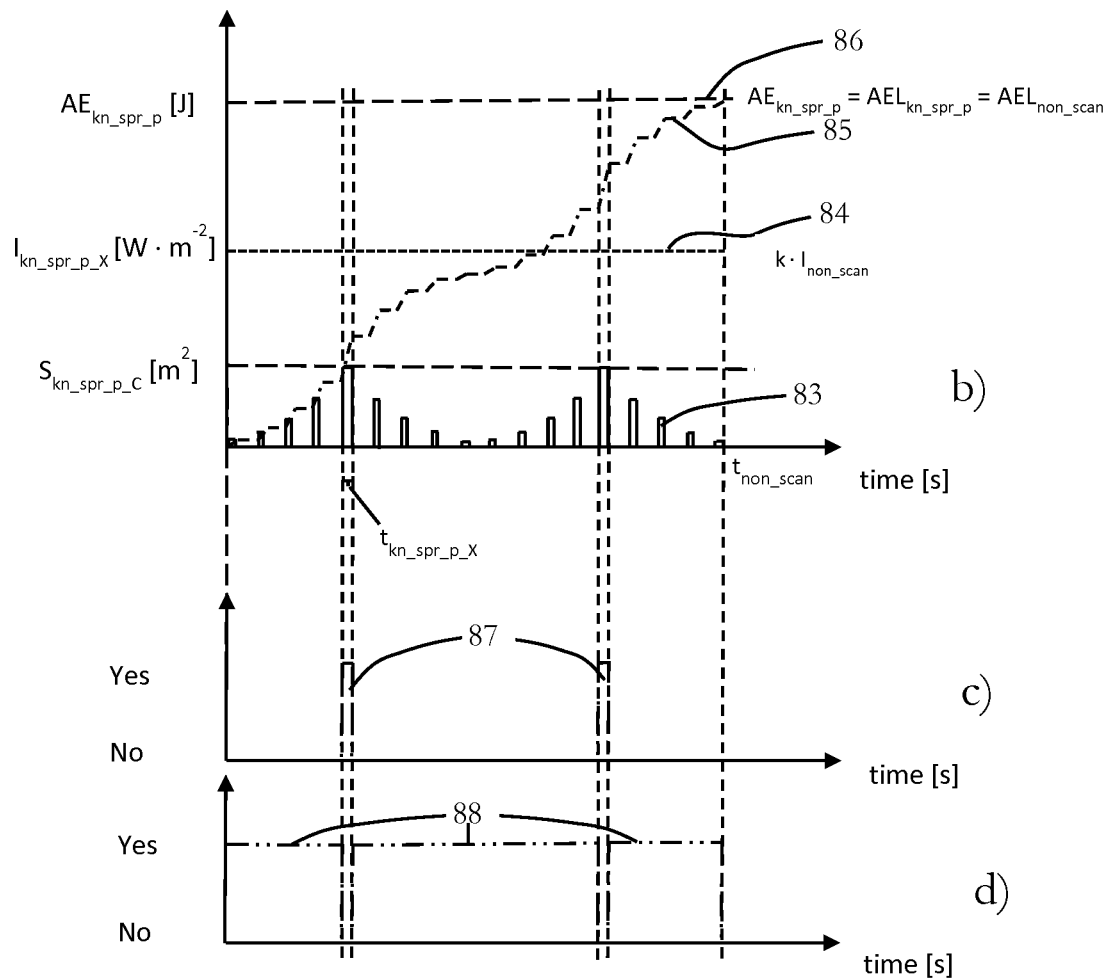

FIG. 9 illustrates an embodiment, which is basically a combination of the embodiments of FIGS. 7 and 8, and it provides a 1D kn spread step-line scan with p-passes, wherein the eye safety is achieved and the SNR is improved by reducing the exposure time while keeping the same amount of active illumination, compared to the example of FIG. 2. The total time needed for acquiring a frame is $t_{non\_scan}$. The number of passes depends on: the k and n parameters, the burst duration, the light source design (e.g. laser design), and the eye safety standard. In this design, the most limiting AEL is $AEL_{kn\_spr\_p\_X}$, the one determined by the pupil exposure time $t_{kn\_spr\_p\_X}$. The $AE_{k\_spr\_p\_C}$ is measured based on one pass of a pupil-centered beam. For instance, applying the eye safety standard IEC 60825-1 ed. 3, 2014, for an extended source laser with wavelength of 850 nm, and a burst duration greater than $5 \cdot 10^{-6}$ [s], the relation to keep for making this design eye safe is $q_n^{-1} \cdot n^{1/4} \cdot p^{1/4} \cdot k^{-3/4}=1$, being $q_n$ the portion of the eye safety pupil illuminated by the beam.

In an upper section a), FIG. 9 illustrates a scene 80, wherein the scene 80 is illuminated with 1D and kn consecutive step-line scanning (including multiple passes p), wherein the light is emitted for a part "k" of the whole frame. The scene 80 is illuminated with light 81 and for illustration purposes, in the middle of the scene 80 the eye safety standard pupil 82 is shown.

Each beam emitted by the light source has a height which is equal to an n-th part of the diameter $d_{pupil}$ of the pupil 82, wherein by illuminating the scene 80 n-times, wherein adjacent areas of the scene 80 are illuminated, the diameter of the pupil 82 is illuminated and by illumination kn-times the scene 80, the whole scene is illuminated, i.e. the scene 80 is divided into k-stripes, wherein each of the k-stripes is divided into n-stripes, wherein the height of a k-stripe corresponds to the diameter of the pupil 82 (similarly to the example of FIG. 4 and the embodiment of FIG. 7, respectively). Each n-stripe is associated with an active light time interval, such that the n-illuminations are spread in time over the frame.

The height of beam line=$d_{pupil}*n^{-1}$.

Hence, $k=v_{FOI}*d_{pupil}^{-1}$, wherein $v_{FOI}$ corresponds to the height of the field of illumination (FOI) corresponding to the height of the scene 60.

The size of the field of illumination FOI for one (k-th) illumination is defined by:

$$FOI_{kn\_spr\_p}[m^2]=h_{FOI}*d_{pupil}*n^{-1},$$

wherein $h_{FOI}$ is the width of the FOI.

The whole FOI (after k scanning steps) is:

$$FOI[m^2]=k*n*FOI_{kn\_spr\_p}.$$

The surface area of the eye safety pupil is defined by:

$$S_{pupil}[m^2]=\pi*(d_{pupil}*2^{-1})^2,$$

wherein the $d_{pupil}$ is the diameter of the eye safety standard pupil.

The peak optical power $[Wm^{-2}]=P_{kn\_spr\_p}=P_{non\_scan}$, wherein $P_{non\_scan}$ is the power of the emitted light during the frame.

The optical power intensity $[Wm^{-2}]=I_{kn\_spr\_p}k*I_{non\_scan}$, wherein $I_{non\_scan}$ is the light intensity of the light emitted to the scene 70 during the frame.

The time $t_{kn\_spr\_p}=t_{non\_scan}*k^{-1}=t_{kn\_spr\_p\_X}*(n*p)$.

On the lower side of FIG. 9, a section b) illustrates a diagram which shows on the ordinate a light intensity and on the abscissa the time from zero to a time $t_{non\_scan}$, which corresponds to one time frame (without limiting the present invention in that regard), wherein the light source is only active for the active light time intervals $t_{kn\_spr\_X}$ also denoted with reference number 83.

In the present embodiment, the frame is divided into eighteen active light time intervals 83 during which each the light source is active (i.e. number of active light time intervals=18), wherein the regions 83 also indicate each that the pupil 82 is illuminated, i.e. $S_{kn\_spr\_p\_C}[m^2]$ corresponds to the area illuminated by a pupil-centered beam, and wherein 9 of the active light time intervals 83 correspond to one pass (i.e. one frame of the embodiment of FIG. 8) and wherein the present embodiment includes two passes (i.e. p=2). Hence, the surface of the pupil 82 is not illuminated fully, but only after n illuminations, the pupil 82 is fully illuminated, and, as the p=2 passes are provided, the pupil 82 will be fully illuminated twice.

The light source provides the light intensity $I_{kn\_spr\_p}$ [Wm$^{-2}$], as is also illustrated as linear curve 84 which increases with each increase of k.

A curve 85 represents the accessible light energy "AE" during the frame for the pupil 82, which stepwise increases during each of the active light time intervals 83 with an amount which is not constant.

A horizontal line 86 shows the total accumulated light energy $AE_{kn\_spr\_p}$ over the whole frame and, thus, over all n- and p-passes, and its value corresponds to the end value of the curve 85 (at the end of the frame).

In the present embodiment, the total energy $AE_{kn\_spr\_p}$ is equal to the eye safety standard limit value $AEL_{kn\_spr\_p}$ for the pupil 82 and also to the $AEL_{non\_scan}$ and $AE_{non\_scan}$ of FIG. 2. Then, if it is achieved that $AE_{kn\_spr\_p\_C}$ is smaller than or equal to $AEL_{kn\_spr\_p\_X}$ as explained above, the embodiment is eye safe.

In a section c) of FIG. 9, the states of the light detection are illustrated and whether the flow electrons from the photodiode of the pixels of the light detector is allowed to flow to their storage nodes. For the intervals 87, which are associated with a pixel (a pixel row in case of a 1D illuminator), which in turn is associated with the central beam is illustrated in section a) and which is exemplary a beam running through the center of the pupil 82, the state is exemplary "yes", which corresponds to an associated active light time interval 83, such that the activation of the light detector (i.e. associated pixels) and of the light source (i.e. associated light beam) is synchronized (in FIG. 9, as the number of passes p=2, the time interval 87, where the pixel associated with the central beam is active, occurs twice, for each pass once).

In a section d) of FIG. 9, time intervals 88 indicate draining of new generated electrons from the light detector (i.e. of the pixel which is active in the interval 87 for the central light beam) by using an overflow gate of each of a pixel of the light detector. The time intervals 88 are provided outside the associated intervals 87, i.e. the time intervals 88 correspond to the time intervals where the light source is not active for the pixel which is associated with the central beam of the light source.

Figure 10:
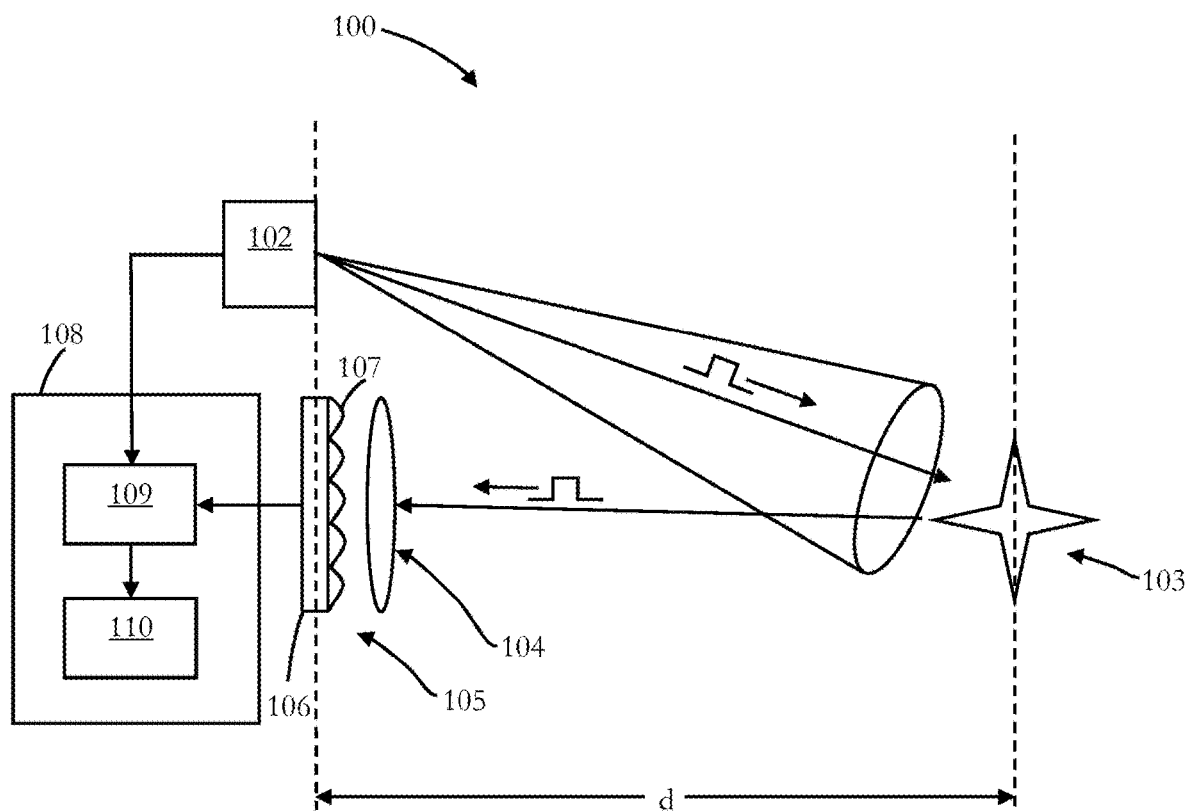
FIG. 10 illustrate an embodiment of a time-of-flight apparatus.

FIG. 10 illustrates an embodiment of a time-of-flight (ToF) apparatus (system) 100, which can be used for depth sensing or providing a distance measurement and which has a circuitry 108 which is configured to perform the methods as discussed herein and which forms a control of the ToF apparatus 100 (and it includes, not show, corresponding processors, memory and storage as it is generally known to the skilled person).

The ToF apparatus 100 has a pulsed light source 102 and it includes light emitting elements (based on laser diodes without limiting the present disclosure in that regard. Other light elements can be used, e.g. based on LEDs or the like.), wherein in the present embodiment, the light emitting elements are narrow band laser elements.

The light source 102 emits pulsed light to a scene 103 (region of interest or object), which reflects the light. By repeatedly emitting light to the scene 103, the scene 103 can be scanned, as it is generally known to the skilled person and as it is also discussed herein. The reflected light is focused by an optical stack 104 to a light detector 105.

The light detector 105 has an image sensor 106, which is implemented based on multiple SPADs (Single Photon Avalanche Diodes) formed in an array of pixels and a microlens array 107 which focuses the light reflected from the scene 103 to the image sensor 106 (to each pixel of the image sensor 106). In other embodiments, as mentioned, the ToF apparatus may generally be based on iToF (indirect ToF) or dToF (direct ToF) (or the like), and, thus, also use other pixel technologies such as CMOS, CAPD, SPADs, etc. Hence, in some embodiments, iToF is implemented based on CAPD, or the light detector is based on SPADs for dToF, gate type ToF or CAPD type ToF, both for iToF, etc.

The light emission time information is fed from the light source 102 to the circuitry or control 108 including a time-of-flight measurement unit 109, which also receives respective time information from the image sensor 106, when the light is detected which is reflected from the scene 103. On the basis of the emission time information received from the light source 102 and the time of arrival information received from the image sensor 106, the time-of-flight measurement unit 109 computes a round-trip time of the light emitted from the light source 102 and reflected by the scene 103 and on the basis thereon it computes a distance d (depth information) between the image sensor 106 and the scene 103.

The depth information is fed from the time-of-flight measurement unit 109 to a 3D image reconstruction unit 110 of the circuitry 108, which reconstructs (generates) a 3D image of the scene 103 based on the depth information received from the time-of-flight measurement unit 109.

Figure 11:
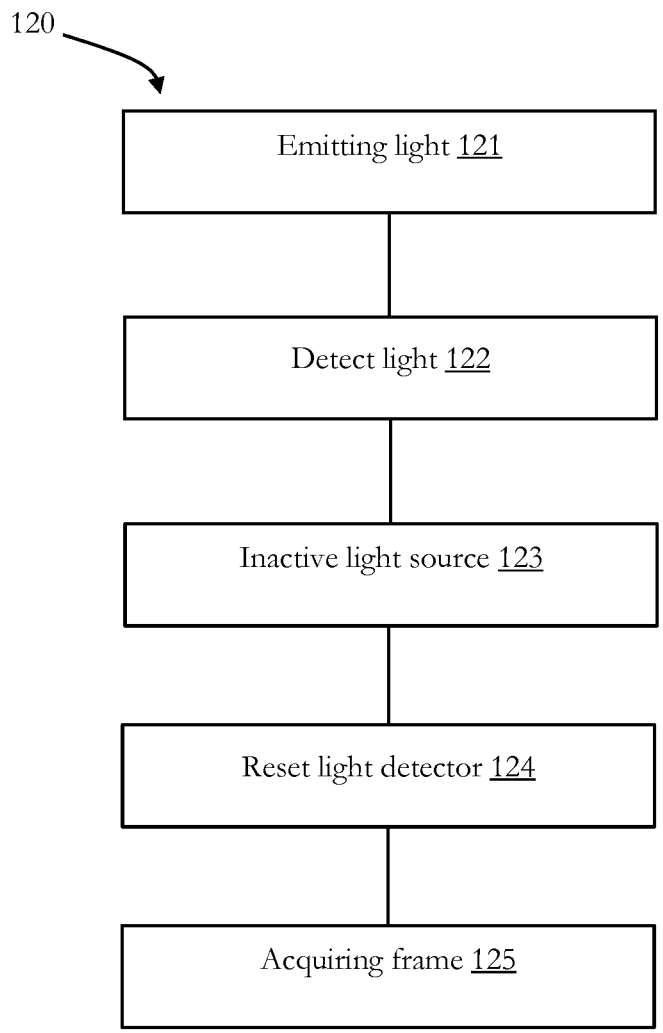
FIG. 11 is a flowchart of a method for controlling the time-of-flight apparatus of FIG. 10.

In the following a method 120 for controlling, for example, the ToF apparatus 100 of FIG. 10, is discussed under reference of FIG. 11 showing a flow chart for the method 120.

At 121, light is emitted to the scene 103 (FIG. 10), wherein, as discussed the light may be emitted in a full-field manner or as a light beam, which may have the diameter of the pupil or which may be even smaller than the pupil. The light is emitted by driving the light source for emitting light during the acquisition of a frame, wherein the light energy accumulated within the frame has a predetermined value, and wherein the frame is divided into active light time intervals during which light is emitted to the scene, as discussed above.

The light is emitted twice to the same area of the scene, as also discussed for the embodiment of FIG. 9 (two passes, p=2).

At 122, light is detected during the active light time intervals.

At 123, between two active light time intervals at least one non-active time interval is provided where the light source is driven to be inactive.

At 124, the light detector is reset outside the active light time intervals, i.e. during the non-active timer intervals provided at 123.

At 125, a frame of detected light is acquired from the light detector, wherein the frame corresponds to a predetermined time interval, as discussed herein, wherein the frame is acquired as discussed, for example, under reference of anyone of the embodiments of FIGS. 6 to 9.

The methods as described herein are also implemented in some embodiments as a computer program causing a computer and/or a processor to perform the method, when being carried out on the computer and/or processor and/or circuitry. In some embodiments, also a non-transitory computer-readable recording medium is provided that stores therein a computer program product, which, when executed by a processor, such as the processor described above, causes the methods described herein to be performed.

It should be recognized that the embodiments describe methods with an exemplary ordering of method steps. The specific ordering of method steps is however given for illustrative purposes only and should not be construed as binding.

Please note that the division of the control or circuitry 108 into units 109 to 110 is only made for illustration purposes and that the present disclosure is not limited to any specific division of functions in specific units. For instance, the control 108 could be implemented by a respective programmed processor, field programmable gate array (FPGA) and the like.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A time-of-flight apparatus, comprising:
a light source for emitting light to a scene;
a light detector for detecting light from the scene; and
a control, the control being configured to:
acquire a frame of detected light from the light detector, wherein the frame corresponds to a predetermined time interval, and
drive the light source for emitting light during the acquisition of the frame, wherein the light energy accumulated within the frame has a predetermined value, and wherein the frame is divided into active light time intervals during which light is emitted to the scene.

(2) The time-of-flight apparatus of (1), wherein the light source is adapted to emit light having a field of illumination which is at least partially smaller than a predefined pupil diameter.

(3) The time-of-flight apparatus of (2), wherein light is emitted to adjacent areas of the scene.

(4) The time-of-flight apparatus of (3), wherein the active light time intervals are associated with the adjacent areas.

(5) The time-of-flight apparatus of anyone of (1) to (4), wherein between two active light time intervals at least one non-active light time interval is provided.

(6) The time-of-flight apparatus of anyone of (1) to (5), wherein the light detector detects light during the active light time intervals.

(7) The time-of-flight apparatus of (6), wherein the light detector is reset outside the active light time intervals.

(8) The time-of-flight apparatus of anyone of (1) to (7), wherein the light detector includes multiple pixels and wherein between different active light time intervals different pixels are active.

(9) The time-of-flight apparatus of anyone of (1) to (8), wherein light is emitted at least twice to the same area of the scene.

(10) The time-of-flight apparatus of anyone of (1), wherein the predetermined value for the accumulated light energy depends on at least one of time and light energy received by a predetermined pupil in the scene.

(11) A method for controlling a time-of-flight apparatus, including a light source for emitting light to a scene and a light detector for detecting light from the scene, the method comprising:
acquiring a frame of detected light from the light detector, wherein the frame corresponds to a predetermined time interval, and
driving the light source for emitting light during the acquisition of the frame, wherein the light energy accumulated within the frame has a predetermined value, and wherein the frame is divided into active light time intervals during which light is emitted to the scene.

(12) The method of (11), further comprising emitting light having a field of illumination which is at least partially smaller than a predefined pupil diameter.

(13) The method of (12), wherein light is emitted to adjacent areas of the scene.

(14) The method of (13), wherein the active light time intervals are associated with the adjacent areas.

(15) The method of anyone of (11) to (14), further comprising providing between two active light time intervals at least one non-active light time interval.

(16) The method of anyone of (11) to (15), further comprising detecting light during the active light time intervals.

(17) The method of (16), further comprising resetting the light detector outside the active light time intervals.

(18) The method of anyone of (11) to (17), wherein the light detector includes multiple pixels and the method further comprises activating different pixels between different active light time intervals.

(19) The method of anyone of (11) to (18), further comprising emitting light at least twice to the same area of the scene.

(20) The method of anyone of (11) to (19), wherein the predetermined value for the accumulated light energy depends on at least one of time and light energy received by a predetermined pupil in the scene.

(21) A computer program comprising program code causing a computer to perform the method according to anyone of (11) to (20), when being carried out on a computer.

(22) A non-transitory computer-readable recording medium that stores therein a computer program product, which, when executed by a processor, causes the method according to anyone of (11) to (20) to be performed.

The invention claimed is:

1. A time-of-flight apparatus, comprising:
a light source for emitting light to a scene;
a light detector for detecting light from the scene; and
circuitry, the circuitry being configured to:
acquire a frame of detected light from the light detector, wherein the frame corresponds to a predetermined time interval, and
drive the light source for emitting light during active light time intervals of the frame, wherein the active light time intervals are controlled such that the light energy accumulated within the frame is below a predetermined maximum value, and wherein the frame is divided into the active light time intervals during which light is emitted to the scene.

2. The time-of-flight apparatus of claim 1, wherein the light source is adapted to emit light having a field of illumination which is at least partially smaller than a predefined pupil diameter.

3. The time-of-flight apparatus of claim 2, wherein light is emitted to adjacent areas of the scene.

4. The time-of-flight apparatus of claim 3, wherein the active light time intervals are associated with the adjacent areas.

5. The time-of-flight apparatus of claim 1, wherein between two active light time intervals at least one non-active light time interval is provided.

6. The time-of-flight apparatus of claim 1, wherein the light detector detects light during the active light time intervals.

7. The time-of-flight apparatus of claim 6, wherein the light detector is reset outside the active light time intervals.

8. The time-of-flight apparatus of claim 1, wherein the light detector includes multiple pixels and wherein between different active light time intervals different pixels are active.

9. The time-of-flight apparatus of claim 1, wherein light is emitted at least twice to the same area of the scene.

10. The time-of-flight apparatus of claim 1, wherein the predetermined value for the accumulated light energy depends on at least one of time and light energy received by a predetermined pupil in the scene.

11. A method for controlling a time-of-flight apparatus, including a light source for emitting light to a scene and a light detector for detecting light from the scene, the method comprising:
    acquiring a frame of detected light from the light detector, wherein the frame corresponds to a predetermined time interval, and
    driving the light source for emitting light during active light time intervals of the frame, wherein the active light time intervals are controlled such that the light energy accumulated within the frame is below a predetermined maximum value, and wherein the frame is divided into the active light time intervals during which light is emitted to the scene.

12. The method of claim 11, further comprising emitting light having a field of illumination which is at least partially smaller than a predefined pupil diameter.

13. The method of claim 12, wherein light is emitted to adjacent areas of the scene.

14. The method of claim 13, wherein the active light time intervals are associated with the adjacent areas.

15. The method of claim 11, further comprising providing between two active light time intervals at least one non-active light time interval.

16. The method of claim 11, further comprising detecting light during the active light time intervals.

17. The method of claim 16, further comprising resetting the light detector outside the active light time intervals.

18. The method of claim 11, wherein the light detector includes multiple pixels and the method further comprises activating different pixels between different active light time intervals.

19. The method of claim 11, further comprising emitting light at least twice to the same area of the scene.

20. The method of claim 11, wherein the predetermined value for the accumulated light energy depends on at least one of time and light energy received by a predetermined pupil in the scene.

* * * * *